UNITED STATES PATENT OFFICE.

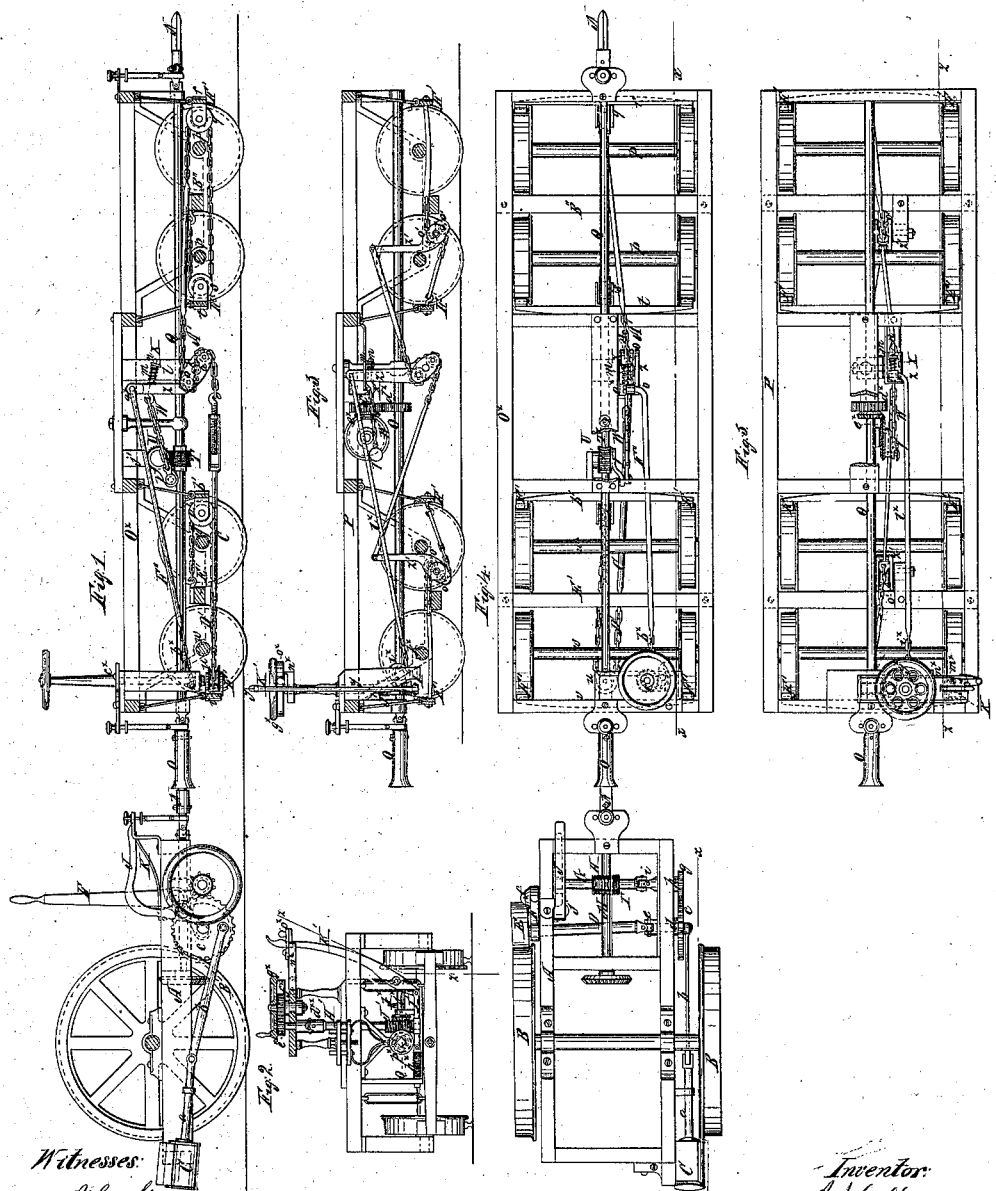

AUGUSTINE I. AMBLER, OF MILWAUKEE, WISCONSIN, ASSIGNOR TO HIMSELF, AND R. N. AMBLER AND W. MARTIN, BOTH OF SAME PLACE.

IMPROVEMENT IN RAILROAD-CAR BRAKES.

Specification forming part of Letters Patent No. 35,647, dated June 17, 1862.

*To all whom it may concern:*

Be it known that I, AUGUSTINE IREL AMBLER, of Milwaukee, in the county of Milwaukee and State of Wisconsin, have invented certain new and useful Improvements in Railroad-Car Brakes; and I do hereby declare that the following is a full, clear, and exact description of the same, reference being had to the accompanying drawings, making a part of this specification, in which—

Figure 1 is a side sectional view of my invention, taken in the line $x\,x$, Fig. 4; Fig. 2, a vertical section of the same, taken in the line $y\,y$, Fig. 3; Fig. 3, a side sectional view of the same, taken in the line $z\,z$, Figs. 2 and 5; Fig. 4, a plan or top view of Fig. 1; Fig. 5, a plan or top view of Fig. 3.

Similar letters of reference indicate corresponding parts in the several figures.

This invention relates to an improved car-brake by which the brakes of a series of connected cars may be simultaneously operated from the locomotive either by steam or by friction from one of the driving-wheels thereof, or each individual car be operated by a brakeman, as in the ordinary brakes in common use.

The object of the invention is to obtain a simple and efficient brake capable of being operated as specified, and one which will admit of all the wheels of a car of a series of cars comprising a train being subjected to a uniform pressure, so as to prevent any of the working parts of the brake being subjected to any undue strain, torsion, or pressure, and breakage, as well as unnecessary wear and tear consequently avoided, and especially to avoid sliding the wheels by unequal pressure.

To enable those skilled in the art to fully understand and construct my invention, I will proceed to describe it.

A represents the framing of a locomotive; B B', its driving-wheels.

C is a steam-cylinder attached to the framing of the locomotive, and having its piston-rod $a$ connected by a driving-rod, $b$, with a toothed crank, $c$, the axis $d$ of which is connected by a universal joint, $e$, to a shaft, D, which has a friction-wheel, E, on it in line with the driving-wheel B' of the locomotive.

The outer bearing of the shaft D is in the lower part of a bent lever, F, the fulcrum-pin $f$ of which passes into the framing of the locomotive. The crank-wheel $c$ gears into a pinion, $g$, the axis $h$ of which is connected by a universal joint, $i$, with a shaft, G, having upon it a screw, H, which gears into a worm-wheel, I. The outer bearing of the shaft G is in the lower part of a lever, J, the fulcrum-pin $j$ of which passes into the framing of the locomotive. This lever J has a spring, K, bearing against it, which has a tendency to keep the screw H on shaft G in gear with the worm-wheel I, which is on a shaft, M, the latter having a longitudinal position in the framing A of the locomotive, and provided with a square link, N, at its outer end to enter the draw-head O of an adjoining car.

The brakes hereinafter described are operated from the shaft M, and when steam is employed for the purpose the shaft G is rotated by means of the driving-rod $b$ of the steam-cylinder C. In case friction is employed for the purpose, the engineer or attendant actuates the lever F and throws the friction-wheel E in contact with the tread of the driving-wheel B', and the screw H may at any time be turned out of gear from the worm-wheel I by the engineer or attendant depressing the outer end of lever J with his foot.

The friction mechanism described would be of use in case of the driving-rod $b$ catching on the center of the toothed crank-wheel $c$. In this case by applying the friction-wheel E to the driving-wheel B' the center may be passed. A contingency of this kind, however, would not be likely to occur; but in case of its occurrence no difficulty can ensue, on account of the remedy at hand.

The parts described form a very simple and efficient means for communicating power to the brakes. The engineer can at any time apply the steam-power to the shaft, and can instantly stop the motion of the latter, when necessary, by depressing the lever J, as set forth.

$O^x$ P represent two car-truck frames, each of which is provided with a central longitudinal rod, Q. These rods perform a double function, to wit: They serve as a means for applying the power to the brakes of the cars, and they also serve, by means of draw-heads O, to form a connection between the several cars of a train, and therefore admit of all the cars of a train having their brakes operated simultaneously. The draw-heads O, therefore, while connecting the several rods Q, must also admit of the rotation of the same. The draw-heads are simply tubes attached to one end of the rod Q of each car and having a square longitudinal opening in them to receive the square link or tongue N on the end of the rod Q of an adjoining car, the links or tongue being secured in the draw-heads by the "draft-head" or coupler between and connecting the cars.

The rod Q of the frame $O^\times$ has upon it near its center a screw, T, which gears into a worm-wheel, U, the axis of which is attached to a pendant, $j'$, of the frame $O^\times$. The worm-wheel U has a crank, V, attached to it, and this crank is connected by a chain, W, to a rod, X, which passes through the upper end of a bent lever, Z, the fulcrum-pin $k$ of which passes into the lower part of a pendant, $l$, attached to frame $O^\times$. (See, more particularly, Fig. 1.) On the rod X there is placed a spiral spring, $m'$, one end of which bears against the lever Z and the other end against a nut, $n$, on the rod X.

In the lower part of the lever Z there are placed two rollers, $o\ o$—one at each side of its fulcrum-pin $k$—and around these rollers a chain, $A'$, passes, which extends over the axles $p$ of one of the trucks of the frame and around a pulley, $q$, connected to the center of the outer brake-bar, $r$, thereof, said chain $A'$ then passing underneath the axles and around a pulley, $s$, attached centrally to the inner brake-bar, $t$, thereof, and having its end connected to a fixed bar, $B''$, between the two pairs of wheels of the truck. The opposite end of the chain $A'$ is connected to a rod, $C'$, which has a chain, $D'$, which passes around a pulley, $u$, attached to the center of the outer brake-bar, $v$, of the other truck, and then passes underneath the axles $w\ w$ of said truck and around a pulley, $a'$, attached centrally to the inner brake-bar, $b'$, the end of the chain $D'$ being connected to a fixed bar, $E'$, which is between the two pairs of wheels of said truck.

From this description it will be seen that when the rod Q of the frame $O^\times$ is turned by the screw T and the worm-wheel U the crank V and chain W will actuate the lever Z, the spring $m$ being compressed under the pull or action of the crank. The lever Z being thus actuated, the chain $A'$, and also the chain $D'$, is tightened or drawn, so as to cause the shoes $F'$ at the end of the brake-bars to press or bear against the wheels.

In consequence of the crank V operating through the medium of the spring $m$, each wheel is subjected to a uniform pressure, and any torsional spring of the rod Q or variation in the movement thereof is compensated for. It is designed that the spring $m$ shall be sufficiently stiff to allow the maximum pressure to be applied to the brake, and a stop, $a^\times$, is attached to the frame $O^\times$, to limit the movement of lever Z, the spring $m$ still admitting of the crank V passing its center by a continuous rotation of rod Q. By this arrangement, therefore, though there may be a slight difference in time in which the highest operating maximum of pressure is obtained by the spring, play, or torsion of the rod, the wheels of each car and the wheels of all the cars of a train will receive the same amount of pressure. This is an important feature of the invention, as it prevents any wheel from slipping in the train while others rotate, and the breakage of wheels is avoided, as well as other parts of the running-gear—a fruitful source of expense and accidents.

The lever Z has a rod, $F''$, attached to its upper part, said rod $F''$ being connected by a chain, $b^\times$, to a hand-shaft, $c^\times$, on the platform, which may be arranged in the usual way. This mechanism admits of the brakes being operated by hand when necessary.

The brakes of the car-frame P are substantially the same as those just described, the only difference being in the substitution of spur and bevel gears $d^\times\ e^\times$ to drive the crank V instead of the screw T and worm-wheel U, and also employing a lever, $Z'$, and rollers $o'\ o'$ (similar to lever Z and rollers $o\ o$ in the frame $O^\times$) to each truck for the brake-bar chains to be actuated from instead of directly from Z. There is one feature, however, which the frame P contains which is essentially different from the device for the same purpose in O, and that is the hand-brake mechanism. In the latter case the upright shaft $H'$ is formed of two parts connected by a universal joint, $d^{\times\times}$, having a pinion, $e^{\times\times}$, at its upper end, which pinion gears into a pinion, $f^\times$, on the shaft of the hand-wheel $g^\times$. The lower end of the shaft $H'$ is stepped in a sliding rod, $I'$, which has a spiral spring, $h^\times$, upon it, and which has a tendency to keep a screw, $J'$, on the lower end of shaft $H'$ in gear with a worm-wheel $i^\times$, on a shaft, $j^\times$, around which a chain, $k^\times$, attached to a rod, $l^\times$, passes, the rod $l^\times$ being connected to lever $Z'$. (See Fig. 2.) The rod $I'$ has a lever, $K'$, connected to its outer end, and this lever passes up through a slot, $m^\times$, in a horizontal plate, $n^\times$, in which the axis or shaft of hand-wheel $g^\times$ is fitted, and a spring catch or fastening, $o^\times$, on the plate $n^\times$ keeps or holds the upper end of the lever $K'$ out from the hand-wheel $g^\times$ and the screw $J'$ in gear with a worm-wheel, $p^\times$, on the rod Q. When, therefore, the upper end of the lever $K'$ is forced outward from the hand-wheel $g^\times$, the screw $J'$ is in gear with the worm-wheel $p^\times$ of rod Q, and the brakes will be operated through the medium of said rod, which is connected to the corresponding rods of the adjoining car or cars. In case, however, the brakes of an individual car are to be operated, the lever $K'$ is released from the catch or fastening, and the spring $h^\times$ throws the screw $J'$ in gear with the worm-wheel $i^\times$ of the shaft $j^\times$. Thus by this simple arrangement the shifting of the screw J' may be very readily accomplished.

I would remark that the brake-bars may be suspended from the framing of the trucks in the usual way, and also that the spring $m$ may be a metallic or an india-rubber one.

Having thus described my invention, what I claim as new, and desire to secure by Letters Patent, is—

1. The employment or use of a steam-cylinder applied to a locomotive and connected with a revolving shaft, M, substantially as shown, when said steam-cylinder is used in combination with revolving brake-rods Q, attached to the cars or the trucks thereof, for the purpose herein set forth.

2. The employment of bent or angle levers, with friction-rollers to obtain perfect uniformity of pressure, in combination with rods and chains to connect the braking-bars and each other when operated by a tumbling or revolving rod, substantially as shown, and for the purpose set forth.

3. Actuating the brakes from the rotating rod Q through the medium of a crank, V, and spring $m$, arranged with a lever, Z, or applied directly to the brakes, so as to operate substantially as and for the purpose herein set forth.

4. The jointed shaft H', provided with the screw J', sliding spring-rod I', lever K', or its equivalent, and the worm-wheel $i^\times$ on the chain-shaft $j^\times$, all arranged as shown, for the purpose specified.

A. I. AMBLER.

Witnesses:
   E. P. HOTCHKISS,
   S. C. FIELD.